L. A. CASGRAIN.
SPEED GAGE.
APPLICATION FILED DEC. 8, 1906.

962,622.

Patented June 28, 1910.

2 SHEETS—SHEET 1.

Witnesses:

Inventor:
Louis A. Casgrain
by his Attorneys
Phillips Van Everen & Fish

L. A. CASGRAIN.
SPEED GAGE.
APPLICATION FILED DEC. 8, 1906.
962,622.
Patented June 28, 1910.
2 SHEETS—SHEET 2.
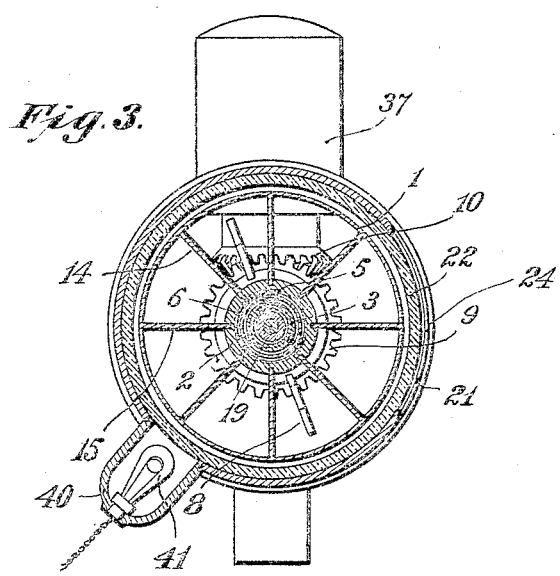
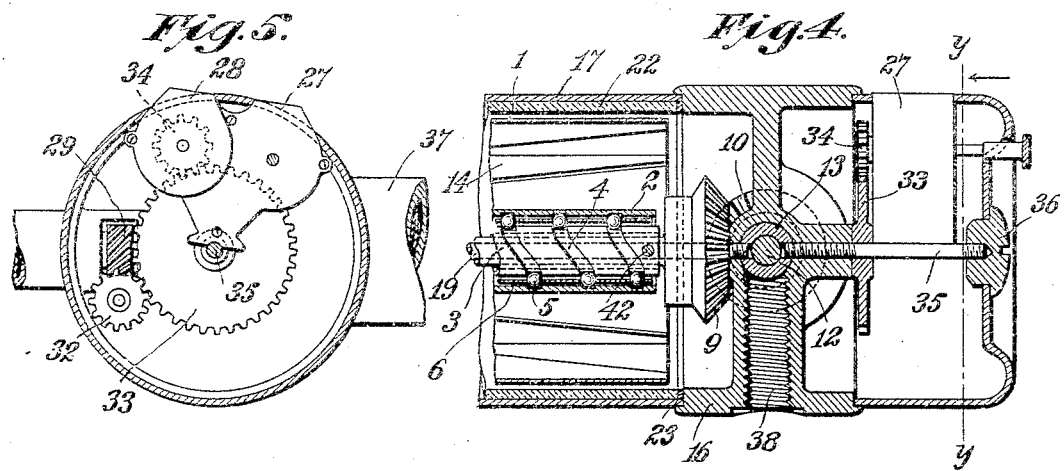
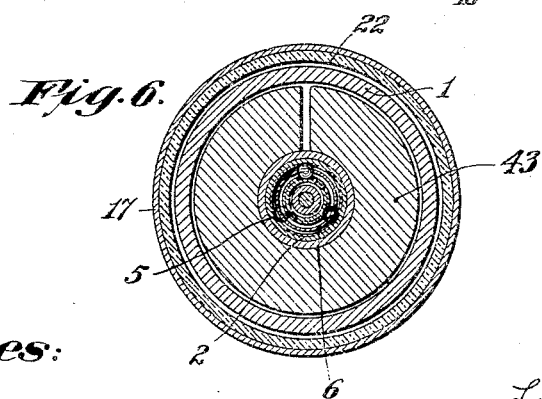
Witnesses:
E. C. Wurdeman
Farnum F. Dorsey
Inventor:
Louis A. Casgrain
by his Attorneys
Phillips, Van Everen & Fish

UNITED STATES PATENT OFFICE.

LOUIS A. CASGRAIN, OF BEVERLY, MASSACHUSETTS.

SPEED-GAGE.

962,622.   Specification of Letters Patent.   Patented June 28, 1910.

Application filed December 8, 1906. Serial No. 346,844.

*To all whom it may concern:*

Be it known that I, LOUIS A. CASGRAIN, a citizen of the United States, residing at Beverly, in the county of Essex and State of Massachusetts, have invented certain new and useful Improvements in Speed-Gages; and I do hereby declare the following to be a full, clear, and exact description of the invention, such as will enable others skilled in the art to which it appertains to make and use the same.

The present invention relates particularly to speed gages adapted for use on automobiles and other vehicles, and its principal object is to increase the facility with which the indications of such devices may be read.

On a fast moving vehicle the reading of the ordinary speed gages and distance recorders is difficult owing to the fact that the vibrations of the vehicle obscure the small figures and fine graduations usually used on such instruments.

One object of the present invention therefore is to produce a speed gage of such mechanical construction that a long series of unusually large graduations may be used without unduly increasing the size of the instrument, so that the indications may be read with ease from a distance and under the most adverse conditions.

Another object of the invention is to so arrange the indicating devices that they may be adjusted to be read from any desired angle according to the location of the instrument or the other circumstances of each particular case.

Other objects of the invention will be noted in connection with the description of the illustrated embodiment thereof.

The invention consists in the improved speed gage hereinafter described, as defined in the claims.

Figure 1:
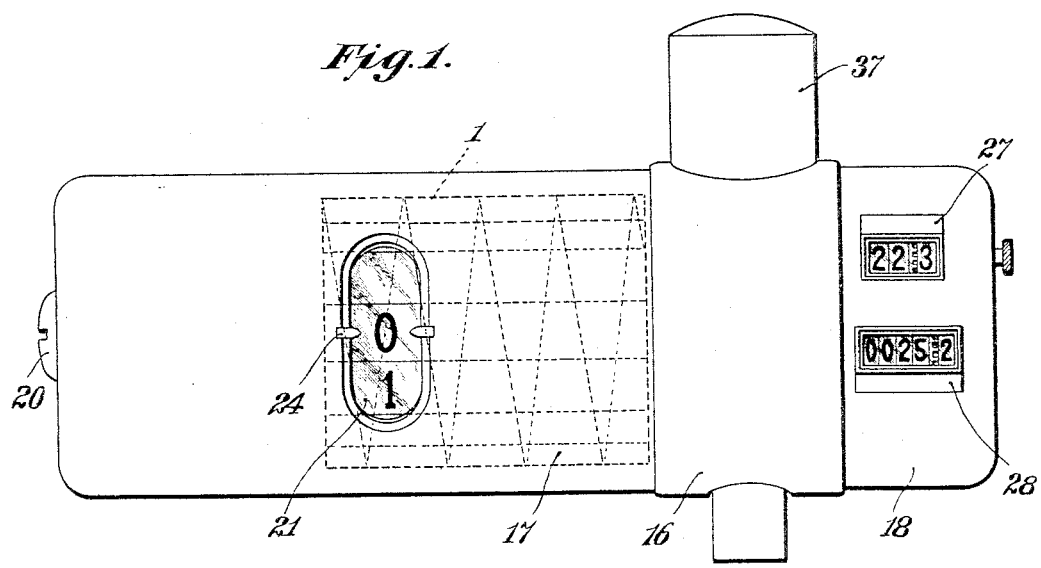
Figure 2:
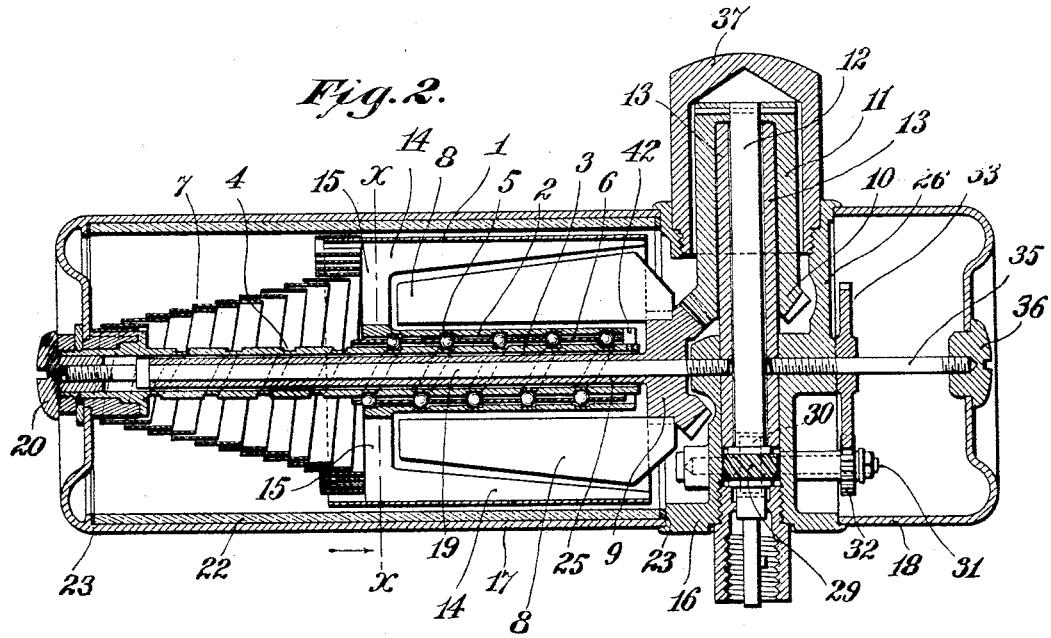

In the drawings Figure 1 is a front elevation of a speed gage embodying the present invention. Fig. 2 is a vertical median section from the same point of view. Fig. 3 is a transverse section looking from left to right on the line $x$—$x$ Fig. 2. Fig. 4 is a horizontal section, looking from beneath, of the right-hand portion of the instrument. Fig. 5 is a vertical section looking from right to left on the line $y$—$y$, Fig. 4, and Fig. 6 is a transverse section illustrating a modification of the invention.

The illustrated embodiment of the invention is a speed gage adapted to be used on an automobile, being secured to the dash board or other convenient part thereof and connected with one of the wheels by a flexible shaft in the usual manner.

The instrument combines with the speed-indicating mechanism a distance recording device or odometer as is common in such instruments.

The speed indicator illustrated consists of a cylindrical drum 1 carried upon a bearing sleeve 2 which is free to rotate. The sleeve 2 is journaled upon a hollow shaft 3 and both the sleeve and shaft are provided with helical grooves 4 in which are located anti-friction balls 5, held in position by a perforated sleeve 6 which is loosely located between the sleeve 2 and shaft 3 and serves as a ball retainer. This construction is such that if the indicator drum 1 be rotated, the balls, acting in the helical grooves, will cause it to simultaneously move to the left along the shaft 3 so that every point in the surface of the indicator drum moves in a helical path.

The indicator drum is normally held in its right-hand position, as shown in Fig. 2, by a spiral spring 7 of which one end is connected to the indicator and the other is connected to a relatively fixed part hereinafter described. This spring increases its force with the longitudinal and rotating movement of the indicator, so that proportionally increasing force is necessary to move the indicator through different distances and to hold it in the positions which it attains.

The indicator is rotated by means of a suitable operating fluid with which it is filled and in which it is immersed. This fluid may be oil, such as kerosene, or other suitable fluid, and it is caused to rotate by means of vanes 8 on a bevel gear wheel 9, which is journaled concentrically with the shaft 3. The gear wheel 9 engages a gear 10 which is at the bottom of the depending driving sleeve 11. The sleeve 11 is fixed to the upper end of the drive shaft 12 journaled in a bearing sleeve 13. The shaft 12 is connected in the usual manner with a flexible shaft by which it is rotated at speeds proportionate to those of the vehicle. By these means the operating fluid is caused to rotate within the indicator drum at a speed proportionate to the speed of the vehicle, and in order that the rotating fluid may drag the indicator around with it, the latter is provided with longitudinal baffles 14 upon its interior surface, these baffles being integral with flat arms 15 by which the indicating drum is fixed to the bearing sleeve 2. In this manner the indicator drum is caused to rotate and move longitudinally a distance proportionate to the speed of the vehicle, and then comes to rest when the increasing resistance of the spring balances the drag of the rotating fluid.

The graduations are arranged in a helix and are marked upon the exterior surface of the indicator drum 1 in such a way that as the indicator rotates and moves longitudinally successive graduations are brought opposite to a fixed point.

The indicating mechanism is inclosed and carried by a casing comprising a fixed part 16 and two relatively-movable parts 17 and 18. The fixed part 16 carries the bearing sleeve 13 in which the shaft 12 rotates, and this sleeve extends upward, as shown in Fig. 2, above the level of the operating fluid, so as to prevent the escape thereof through the bearing. The part 17 of the casing is cylindrical and is connected with the part 16 by a screw-threaded rod 19 screwed into the part 16 and engaging a nut 20 at the end of the part 17. The hollow shaft 3 is also fixed in the casing member 17, and the spring 7 is connected therewith at one end, as shown in Fig. 2. The casing member 17 is provided with a window 21 through which the graduations on the indicator drum may be seen, and to prevent the escape of fluid through this window a glass tube 22 is located within the casing member 17 and engages packing rings 23 at each end. At each side of the window 21 is a pointer 24 to indicate the significant figure of the graduations.

The construction above described is such that by loosening the nut 20 the casing member 17 may be rotated with respect to the member 16 to change the position of the window 21, so that the window may be visible from different angles to suit the convenience of the user according to the position in which the instrument is located in the vehicle. It will be noted that in so doing the accuracy of the instrument is not in any degree affected, owing to the fact that the spring 7 and the hollow shaft 3 are connected with the casing member 17, while the actuating mechanism, comprising the gears 9 and 10, is not disturbed, owing to the concentric arrangement of the gear 9 and the casing member 17.

In order to afford an ample bearing for the gear 9 it is provided with an extended tube or sleeve 25 embracing the screw-threaded rod 19.

The casing member 18, which contains the odometer is separated from the remainder of the casing by a partition 26 formed in the fixed part 16. The odometer may be of any suitable form and need not be specifically described. It is arranged to be read through windows 27 and 28 in the casing member 18, and is actuated, as shown in Figs. 2 and 5, through a train of mechanism comprising a worm 29 on the drive shaft 12, a worm wheel 30 on a horizontal shaft 31 journaled in the casing member 16, a pinion 32 on the shaft 31 engaging a gear wheel 33, and a pinion 34 connected with the mechanism of the odometer and meshing with the gear 33. The gear 33 is journaled upon a threaded rod 35 by which the casing member 18 is secured in place, the outer end of the rod engaging a nut 36 at the end of the casing member. The construction above described is such that by loosening the nut 36 the casing member 18 together with the odometer may be rotated with respect to the fixed casing member 16 to adjust it in the same manner as the casing member 17 is adjusted.

A thimble 37 screwed into the upper part of the casing member 16 incloses the upper end of the shaft 12 and the sleeves 11 and 13.

The fixed casing member 16 is mounted upon the vehicle by means of a suitable bracket screwed into a threaded hole 38 at the back of the casing.

It is customary to illuminate the dials of speed gages for convenience in using them at night, the lights used for this purpose being usually mounted in hoods located above or in front of the dials so as to throw the light upon them. In the present invention an arrangement is provided by which the graduations may be illuminated without any exterior source of illumination, thereby avoiding the reflection of the light from the exterior section of the glass window and the unsightly and inconvenient projection of the illuminating device above or in front of the window. To this end the casing member 17 is provided at its rear and lower portion with a projecting thimble 40 in which an electric light 41 is located. This light shines through the glass tube 22 and through the transparent body of operating fluid and also through the indicator drum 1, which is made of some suitable transparent material such as celluloid, or provided with transparent portions at the graduations, so that the portion of the indicator visible through the window is illuminated and rendered visible in the dark by transmitted light and not by reflected light in the ordinary manner. The projection 40 in which the light is located, being at the back of the instrument is not visible and does not have the usual unsightly portions of such devices.

The ball bearing upon which the indicator drum is mounted permits it to move with the greatest freedom both rotatably and horizontally there being no sliding contact except the very light contact between the ball retainer and the balls. As the indicator rotates the retainer and the balls are screwed out of the sleeve 2 but not sufficiently to interfere with the operation of the device and upon the return of the indicator it is screwed back in again. A stop pin 42 on the shaft 3 limits the movement of the ball retainer.

The mechanism above described by which the indicator is rotated, comprising the baffles 14, the operating fluid and the paddles 8 is that which is preferably used. Other means may however, be used for producing a drag or torsional force to rotate the indicator. Thus, for example, the indicator may be made of suitable metal and a rotating magnet 43 may be used as shown in Fig. 6 to produce a magnetic drag upon the indicator. The arrangement hereinbefore described is preferred however, since it not only provides what the inventor considers the preferable means for rotating the indicator but the operating fluid serves also to lubricate the parts and to protect them from rust and also to deaden the vibrations imparted to the instrument from the vehicle.

By the use of a helical series of graduations sufficient space is afforded to have a separate graduation, large and easily visible, for every mile from 1 to 50 or more miles per hour of speed.

The invention is not limited to the details of construction and operation of the illustrated embodiment but may be embodied in other forms broadly defined in the claims.

Having now described the invention, what is claimed is:—

1. A speed gage having, in combination, a rotary indicator provided with a series of graduations to indicate a given range of speeds extending around the indicator a plurality of times, means actuated by the object of which the speed is to be indicated for exerting a rotative force on the indicator varying with the speed of the object, and a spring acting on the indicator in opposition to said rotative force, constructed and arranged to permit the indicator to make a plurality of revolutions as the speed of the object varies through the range for which the indicator is designed and coöperating with said force to bring each graduation opposite a fixed point as the object attains the speed indicated by the graduation, substantially as described.

2. A speed gage having, in combination, a cylindrical indicator arranged to rotate and move longitudinally and provided upon its surface with a helical series of graduations arranged to register successively with a fixed point, and means for rotating the indicator and means for simultaneously moving the indicator longitudinally to cause the graduations to register successively with said point as the speed of the object, the speed of which is to be indicated, varies, substantially as described.

3. A speed gage having, in combination, a casing provided with a window, a cylindrical indicator arranged to rotate and move longitudinally within the casing and provided upon its surface with a series of graduations arranged helically so as to register successively with the window, and means for rotating the indicator and means for simultaneously moving the indicator longitudinally to cause the graduations to register successively with said window as the speed of the object, the speed of which is to be indicated, varies, substantially as described.

4. A speed gage, having, in combination, a cylindrical indicator, means for imparting to the indicator a force varying with the speed to be indicated, means whereby the indicator is caused to simultaneously rotate and move axially under the influence of said force and a spring connected with the indicator to resist such movement, substantially as described.

5. A speed gage, having, in combination, an indicator mounted on a screw-threaded axis so as to move longitudinally as it is rotated thereon and means actuated by the object of which the speed is to be indicated for imparting rotary movement to the indicator varying in extent with the speed of the object, substantially as described.

6. A speed gage having, in combination, an indicator provided with a sleeve having an internal helical groove, a shaft on which the sleeve is mounted provided with a spiral groove, and anti-friction balls interposed between the sleeve and the shaft and seated in the grooves, substantially as described.

7. A speed gage having, in combination, an indicator provided with a sleeve having an internal helical groove, a shaft on which the sleeve is mounted provided with a spiral groove, anti-friction balls between the sleeve and shaft and seated in the grooves, and a ball cage longitudinally movable with relation to the sleeve and shaft between the sleeve and the shaft to hold the balls in place, substantially as described.

8. A speed gage having, in combination, a casing, indicating mechanism and operating fluid therein, a drive shaft for actuating the mechanism entering the bottom of the casing and a bearing sleeve for the shaft extending from the bottom of the casing to a point above the level of the operating fluid, to prevent the escape of fluid through the bearing, substantially as described.

9. A speed gage having, in combination, a casing, indicating mechanism and operating fluid therein, a drive shaft entering the bottom of the casing, a bearing sleeve therefor extending from the bottom of the casing to a point above the level of the operating fluid, a driving sleeve fixed to the top of the shaft and depending about the bearing sleeve, and a bevel gear carried by the driving sleeve for actuating the indicating mechanism, substantially as described.

10. A speed gage having, in combination, a casing comprising a fixed part and a relatively movable part provided with a reading aperture, and indicating mechanism carried by the movable part and movable back of the aperture so as to be read therethrough, said part being movable to change the position of the indicating devices without interfering with their operation, so as to permit the instrument to be read from the desired direction, substantially as described.

11. A speed gage having, in combination, a casing comprising a fixed part and a relatively movable part provided with a reading aperture, actuating mechanism mounted in the fixed part, and an indicator rotatably mounted in the movable part and movable back of the aperture so as to be read therethrough, the movable part being rotatable about the axis of rotation of the indicator to change the direction from which the instrument may be read, substantially as described.

12. A speed gage having, in combination, a casing, a hollow cylindrical indicator, inwardly-extending baffles on the interior of the indicator, a fluid filling the interior of the indicator, a rotating device within the indicator for imparting rotary motion to the fluid, actuating connections between said device and the object the speed of which is to be measured, and means for causing the indicator to move axially when rotated, substantially as described.

13. A speed gage having, in combination, a casing provided with a window, a cylindrical indicator provided with a series of graduations to indicate a given range of speed extending around its cylindrical surface a plurality of times, means actuated by the object of which the speed is to be indicated, for exerting a rotative force on the indicator varying with the speed of the object, and a spring acting on the indicator in opposition to said rotative force constructed and arranged to permit the indicator to make a plurality of revolutions as the speed of the object varies through the range for which the indicator is designed and coöperating with said force to bring each graduation opposite said window as the object attains the speed indicated by the graduation, substantially as described.

14. A speed gage, having, in combination, a cylindrical indicator arranged to rotate and move longitudinally and provided upon its surface with a series of graduations extending around its cylindrical surface a plurality of times arranged to register successively with a fixed point and means for rotating the indicator and means for moving it longitudinally to bring said graduations into register successively with said point as the speed of the object the speed of which is to be indicated varies, one of said means depending for operation on the action of the other, substantially as described.

15. A speed gage having, in combination a casing provided with a window, a cylindrical indicator arranged to rotate and move longitudinally within the casing and provided upon its surface with a series of graduations extending around its cylindrical surface a plurality of times arranged to register successively with the window and means for rotating the indicator and means for moving it longitudinally to bring said graduations successively into register with said window as the speed of the object the speed of which is to be indicated varies, one of said means depending for operation on the action of the other, substantially as described.

In testimony whereof I affix my signature, in presence of two witnesses.

LOUIS A. CASGRAIN.

Witnesses:
 FRED O. FISH,
 FARNUM F. DORSEY.